US012647732B2

(12) United States Patent
Yao et al.

(10) Patent No.: US 12,647,732 B2
(45) Date of Patent: Jun. 2, 2026

(54) ELECTRONIC DEVICE AND SPEAKER DEVICE

(71) Applicant: InnoLux Corporation, Miao-Li County (TW)

(72) Inventors: I-An Yao, Miao-Li County (TW); Shun-Cheng Chen, Miao-Li County (TW); Kuan-Feng Lee, Miao-Li County (TW); Jui-Jen Yueh, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 359 days.

(21) Appl. No.: 18/404,466

(22) Filed: Jan. 4, 2024

(65) Prior Publication Data

US 2024/0251206 A1 Jul. 25, 2024

(30) Foreign Application Priority Data

Jan. 19, 2023 (CN) ......................... 202310073934.7

(51) Int. Cl.
*H04R 9/04* (2006.01)
*H04R 9/02* (2006.01)
*H04R 9/06* (2006.01)

(52) U.S. Cl.
CPC ............. *H04R 9/046* (2013.01); *H04R 9/025* (2013.01); *H04R 9/06* (2013.01)

(58) Field of Classification Search
CPC .......... H04R 9/046; H04R 9/025; H04R 9/06; H04R 13/00; H04R 9/02; H04R 2400/11
See application file for complete search history.

(56) References Cited

U.S. PATENT DOCUMENTS 11,521,778 B2 * 12/2022 Kim ..................... H05B 6/1272
2023/0053470 A1 * 2/2023 Chou ....................... H04R 1/02

FOREIGN PATENT DOCUMENTS

CN 112489919 A 3/2021
TW M624678 U 3/2022

OTHER PUBLICATIONS

Zhou et al. "Micro-coil Element, Array Micro-coil Element and Device" (Year: 2020).*

* cited by examiner

*Primary Examiner* — Brian Ensey
(74) *Attorney, Agent, or Firm* — MUNCY, GEISSLER, OLDS & LOWE, P.C.

(57) ABSTRACT

An electronic device includes a substrate; and a coil structure disposed on the substrate. The coil structure is provided with a first conductor layer including a connection line; a second conductor layer including a plurality of line segments separated from each other; and a first insulation layer disposed between the first conductor layer and the second conductor layer, and provided with a plurality of first openings, wherein adjacent two of the plurality of line segments are electrically connected to the connection line through the plurality of first openings.

20 Claims, 8 Drawing Sheets

ELECTRONIC DEVICE AND SPEAKER DEVICE

CROSS-REFERENCE TO RELATED APPLICATIONS

This application claims the benefits of the Chinese Patent Application Serial Number 202310073934.7, filed on Jan. 19, 2023, the subject matter of which is incorporated herein by reference.

BACKGROUND

Field of the Disclosure

The present disclosure relates to an electronic device and a speaker device and, more particularly, to an electronic device and a speaker device having a coil structure.

Description of Related Art

With the progress of science and technology and in order to meet the needs of users, all electronic devices are developing towards thinning, light weight or miniaturization. Most of the speakers currently available on the market are dynamic speakers. The main components of the dynamic speaker include a magnetic element, a coil, and a diaphragm. When the coil is energized, a magnetic field is generated. Through the interaction between this magnetic field and the magnetic element, it causes the diaphragm to vibrate, which further pushes the air to generate sound. In addition, in the camera lens module used in mobile phones, the voice coil motor responsible for dynamic focusing also has coils, and uses the changes of magnetic force to drive the lens to perform fine and precise movement.

However, in the prior art, the number of coil turns of the dynamic speaker and the voice coil motor cannot be adjusted, and the overall volume is relatively large, resulting in difficulties in application to miniaturized electronic devices.

Therefore, there is an urgent need to provide an improved design in order to achieve the purpose of thinning, light weight or miniaturization.

SUMMARY

The present disclosure provides an electronic device, which includes a substrate; and a coil structure disposed on the substrate, and provided with: a first conductor layer including a connection line; a second conductor layer including a plurality of line segments separated from each other; and a first insulation layer disposed between the first conductor layer and the second conductor layer, and provided with a plurality of first openings, wherein adjacent two of the plurality of line segments are electrically connected to the connection line through the plurality of first openings.

The present disclosure further provides a speaker device, which includes: a substrate; a plurality of scanning lines arranged on the substrate; a plurality of data lines arranged on the substrate, wherein the plurality of data lines intersect with the plurality of scanning lines, respectively; a plurality of active elements arranged on the substrate, wherein each of the plurality of active elements is electrically connected to one of the plurality of scan lines and one of the plurality of data lines; and a plurality of coil structures arranged on the substrate, wherein the plurality of coil structures are electrically connected to the plurality of active elements, respectively.

Other novel features of the disclosure will become more apparent from the following detailed description when taken in conjunction with the accompanying drawings.

DETAILED DESCRIPTION OF EMBODIMENT

Figure 1A:
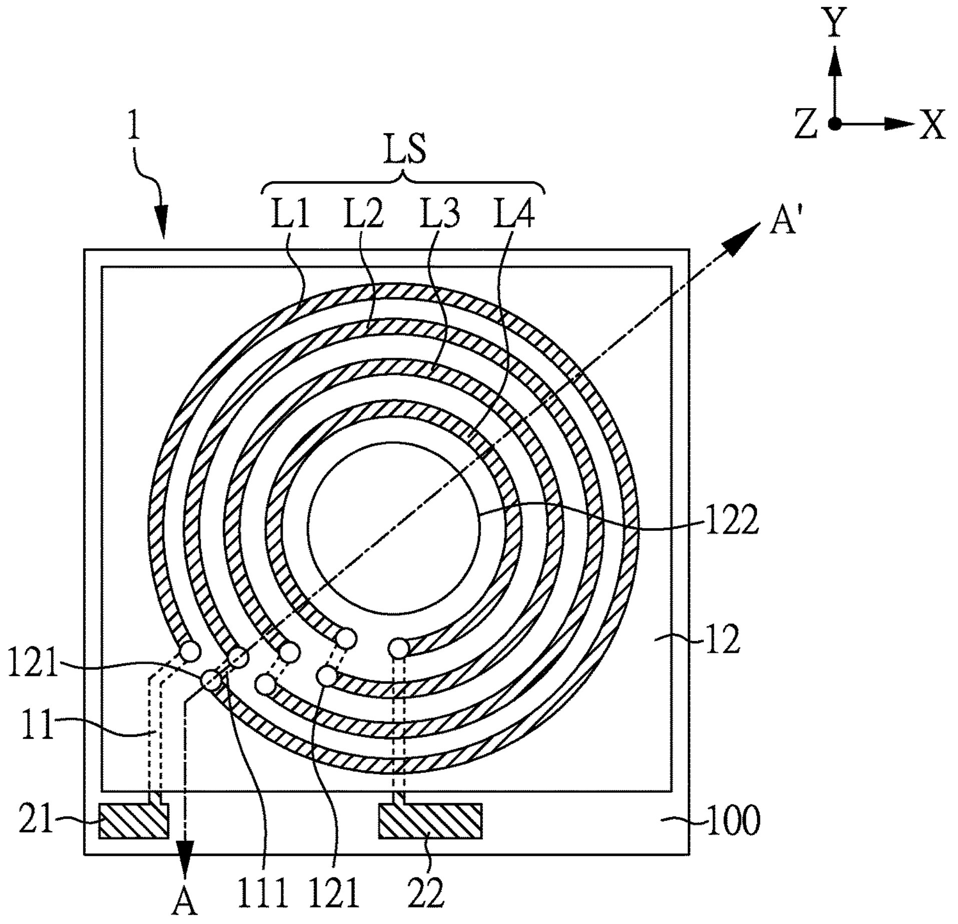
FIG. 1A is a top view of an electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided. Furthermore, in the specification and claims, unless otherwise specified, ordinal numbers, such as "first", "second", etc., used herein are intended to distinguish elements rather than disclose explicitly or implicitly that names of the elements bear the wording of the ordinal numbers. The ordinal numbers do not imply what order an element and another element are in terms of space, time or steps of a manufacturing method.

In the entire specification and the appended claims of the present disclosure, certain words are used to refer to specific components. Those skilled in the art should understand that electronic device manufacturers may refer to the same components by different names. The present disclosure does not intend to distinguish those components with the same function but different names. In the claims and the following description, the words "comprise", "include" and "have" are open type language, and thus they should be interpreted as meaning "including but not limited to . . . ". Therefore, when the terms "comprise", "include" and/or "have" are used in the description of the present disclosure, they specify the existence of corresponding features, regions, steps, operations and/or components, but do not exclude the existence of one or more corresponding features, regions, steps, operations and/or components.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

It should be noted that the technical solutions provided by the different embodiments described hereinafter may be used interchangeably, combined or mixed to form another embodiment without violating the spirit of the present disclosure.

Figure 1B:
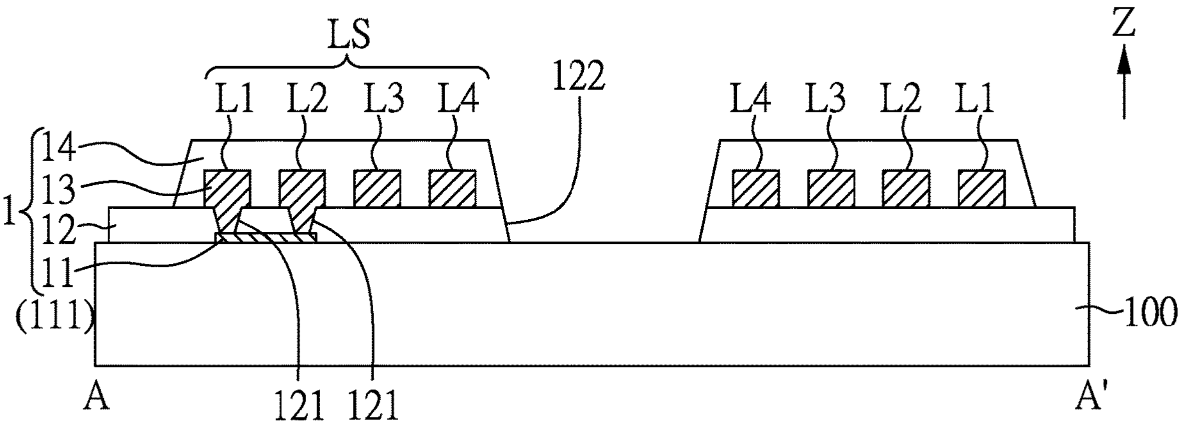
FIG. 1B is a cross-sectional view of the electronic device taken along line A-A' in FIG. 1A.

FIG. 1A is a top view of an electronic device according to an embodiment of the present disclosure. FIG. 1B is a cross-sectional view of the electronic taken along line A-A' in FIG. 1A.

In one embodiment of the present disclosure, as shown in FIG. 1A and FIG. 1B, the electronic device may include: a substrate 100; and a coil structure 1 disposed on the substrate 100. The coil structure 1 may comprise: a first conductor layer 11 including a connection line 111; a second conductor layer 13 including a plurality of line segments LS, wherein the plurality of line segments LS are separated from each other; and a first insulation layer 12 arranged between the first conductor layer 11 and the second conductor layer 13, wherein the first insulation layer 12 includes a plurality of first openings 121. In the electronic device, adjacent two of the plurality of line segments LS are electrically connected to the connection line 111 through the plurality of first openings 121.

More specifically, as shown in FIG. 1A, the coil structure 1 may include a plurality of concentric circular line segments LS separated from each other, such as a first line segment L1, a second line segment L2, a third line segment L3 and a fourth line segment L4. The length of the first line segment L1 may be greater than the length of the second line segment L2, and the first line segment L1 may be arranged to surround the second line segment L2. The length of the second line segment L2 may be greater than the length of the third line segment L3, and the second line segment L2 may be arranged to surround the third line segment L3. The length of the third line segment L3 may be greater than the length of the fourth line segment L4, and the third line segment L3 may be arranged to surround the fourth line segment L4. In addition, as shown in FIG. 1B, in the cross-sectional view taken along line AA', the first insulation layer 12 may be disposed on the first conductor layer 11, and the second conductor layer 13 may be disposed on the first insulation layer 12, wherein the first line segment L1 and the second line segment L2 may be electrically connected to the connection line 111 through the first opening 121 of the first insulation layer 12, so that the first line segment L1 and the second line segment L2 are electrically connected to each other. Similarly, in other cross-sectional views, the second line segment L2 and the third line segment L3 may be electrically connected to another connection line 111 through another first opening 121 of the first insulation layer 12, so that the second line segment L2 and the third line segment L3 are electrically connected to each other. The third line segment L3 and the fourth line segment L4 may be electrically connected to another connection line 111 through another first opening 121 of the first insulation layer 12, so that the third line segment L3 and the fourth line segment L4 are electrically connected to each other. Therefore, in the present disclosure, the plurality of line segments LS may be electrically connected to each other in series thereby forming an induction coil.

In this embodiment, as shown in FIG. 1A, the coil structure 1 is provided with a plurality of concentric circular line segments LS separated from each other. However, in other embodiments of the present disclosure, the coil structure 1 may also be provided with a plurality of concentric rectangular line segments or concentric elliptical line segments separated from each other, but the present disclosure is not limited thereto. In addition, the coil structure 1 in FIG. 1A includes four line segments LS separated from each other. However, in other embodiments of the present disclosure, the coil structure 1 may include two, three, five or more line segments LS separated from each other, but the present disclosure is not limited thereto. In addition, in this embodiment, as shown in FIG. 1B, the second conductor layer 13 is disposed on the first conductor layer 11. However, in other embodiments of the present disclosure, although not shown in the figures, the first conductor layer 11 may also be disposed on the second conductor layer 13 and electrically connected to each other through the first opening 121 of the first insulation layer 12.

In the present disclosure, the material of the substrate 100 may include glass, quartz, sapphire, ceramics, polycarbonate (PC), polyimide (PI), polyethylene terephthalate (PET), polymethylmethacrylate (PMMA), other suitable substrate materials, or a combination thereof, but the disclosure is not limited thereto. In the present disclosure, the first conductor layer 11 and the second conductor layer 13 may be prepared using the same or different materials, and the first conductor layer 11 and the second conductor layer 13 may include metal, metal oxide, an alloy a combination thereof, such as gold, silver, copper, aluminum, chromium, platinum, indium zinc oxide (IZO), indium tin oxide (ITO), indium tin zinc oxide (ITZO), indium gallium zinc oxide (IGZO), or aluminum oxide Zinc (AZO), but the present disclosure is not limited thereto. In the present disclosure, the first insulation layer 12 may be a single-layer or multi-layer structure, and the material of the first insulation layer 12 may include silicon oxide, silicon nitride, silicon oxynitride, or a combination thereof, but the present disclosure is not limited thereto.

In one embodiment of the present disclosure, the first insulation layer 12 may further include an opening 122, wherein the plurality of line segments LS may be arranged to surround the opening 122. More specifically, as shown in FIG. 1A, the first line segment L1, the second line segment L2, the third line segment L3 and the fourth line segment L4 may be respectively arranged to surround the opening 122. The opening 122 may be used to accommodate other components, such as magnetic permeable elements, but the present disclosure is not limited thereto.

In one embodiment of the present disclosure, as shown in FIG. 1A, the electronic device may further include a first electrode 21 and a second electrode 22 respectively disposed on the substrate 100, wherein the first electrode 21, the first line segment L1, the second line segment L2, the third line segment L3, the fourth line segment L4 and the second electrode 22 may be electrically connected in series. The external voltage source/current source may provide voltage/current to the coil structure 1 through the first electrode 21 and/or the second electrode 22. In the present disclosure, the same or different materials may be used to prepare the first electrode 21 and the second electrode 22, and the materials of the first electrode 21 and the second electrode 22 may be as described for the first conductor layer 11 or the second conductor layer 13, so that a detailed description is deemed unnecessary. In addition, in one embodiment of the present disclosure, the first electrode 21 and the second electrode 22 may be respectively formed in the first conductor layer 11 or the second conductor layer 13 to simplify the process steps. However, in another embodiment of the present disclosure, the first electrode 21 and the second electrode 22 may also be respectively formed in other conductor layers.

In one embodiment of the present disclosure, as shown in FIG. 1B, the coil structure 1 may further include a first protection layer 14 disposed on the second conductor layer 13. The first protection layer 14 may be used to protect the second conductor layer 13. In the present disclosure, the material of the first protection layer 14 may be as described for the first insulation layer 12, and thus a detailed description is deemed unnecessary.

Figure 2A:
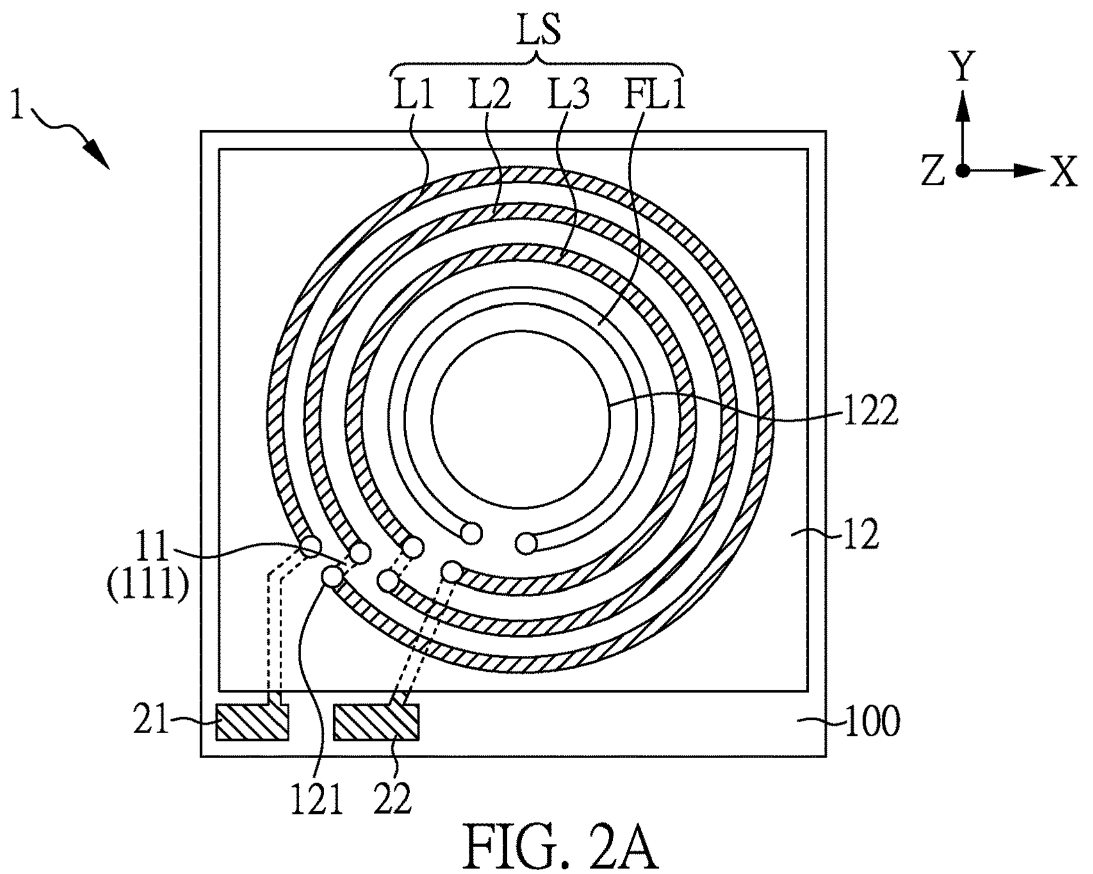
FIG. 2A and FIG. 2B are top views of an electronic device according to an embodiment of the present disclosure.
Figure 2B:
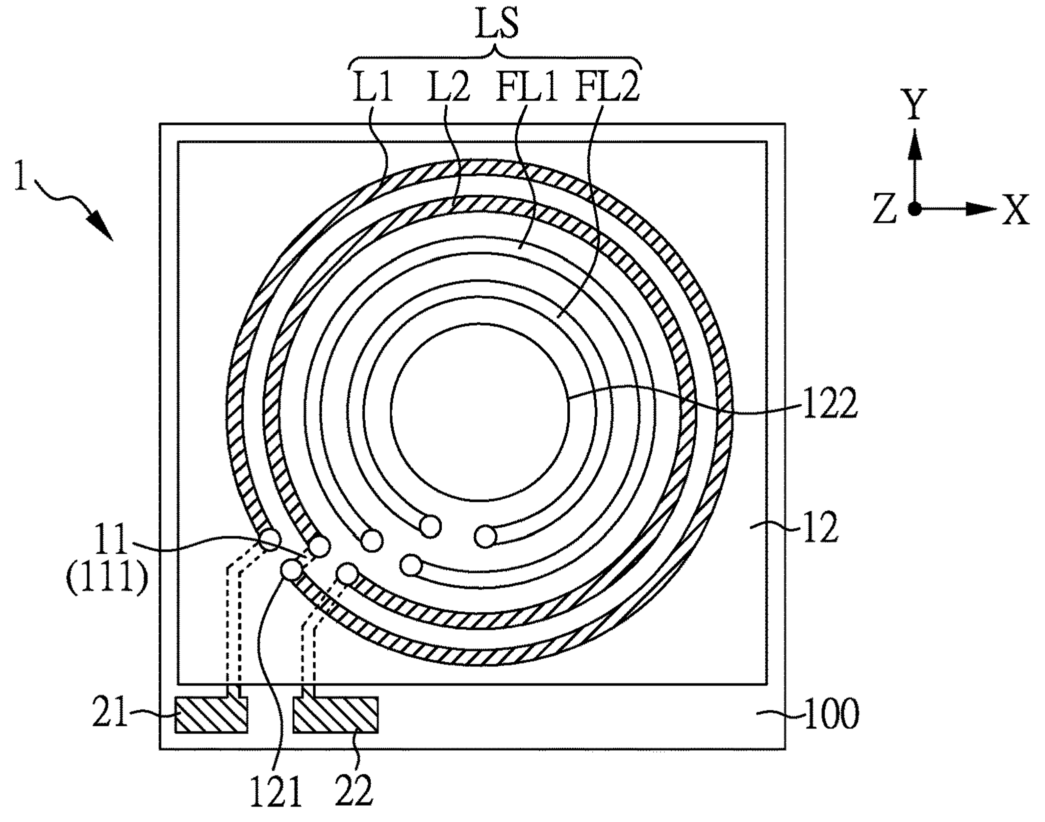

FIG. 2A and FIG. 2B are top views of an electronic device according to an embodiment of the present disclosure, wherein the electronic device in FIG. 2A and FIG. 2B is similar to the electronic device in FIG. 1A except for the following differences.

In one embodiment of the present disclosure, as shown in FIG. 2A and FIG. 2B, a plurality of line segments of the coil structure 1 may include a floating line segment FL1, and the floating line segment FL1 is electrically insulated from the first line segment L1 or the second line segment L2. More specifically, as shown in FIG. 2A, the coil structure 1 may include a plurality of concentric circular line segments LS separated from each other, such as a first line segment L1, a second line segment L2, a third line segment L3 and a floating line segment FL1, wherein the length of the first line segment L1 may be greater than the length of the second line segment L2, the length of the second line segment L2 may be greater than the length of the third line segment L3, the length of the third line segment L3 may be greater than the length of the floating line segment FL1, and the first line segment L1, the second line segment L2 and the third line segment L3 may be arranged to surround the floating line segment FL1. The first line segment L1, the second line segment L2, the third line segment L3 and the floating line segment FL1 are electrically insulated from each other, and thus the first electrode 21, the first line segment L1, the second line segment L2, the third line segment L3 and the second electrodes 22 may be electrically connected in series thereby forming an induction coil.

In the present disclosure, the coil structure 1 of FIG. 2A includes one floating line segment FL1. In other embodiments of the present disclosure, the coil structure 1 may include a plurality of floating line segments FL1 and FL2, as shown in FIG. 2B, and the coil structure 1 may include a plurality of concentric circular line segments LS separated from each other, such as a first line segment L1, a second line segment L2 and floating line segments FL1 and FL2, wherein the length of the first line segment L1 may be greater than the length of the second line segment L2, the length of the second line segment L2 may be greater than the length of the floating line segment FL1, the length of the floating line segment FL1 may be greater than the length of the floating line segment FL2, and the first line segment L1 and the second line segment L2 may be arranged to surround the floating line segments FL1 and FL2. The first line segment L1 and the second line segment L2 are electrically insulated from the floating line segments FL1 and FL2, and thus the first electrode 21, the first line segment L1, the second line segment L2 and the second electrode 22 may be electrically connected in series thereby forming an induction coil.

Figure 3A:
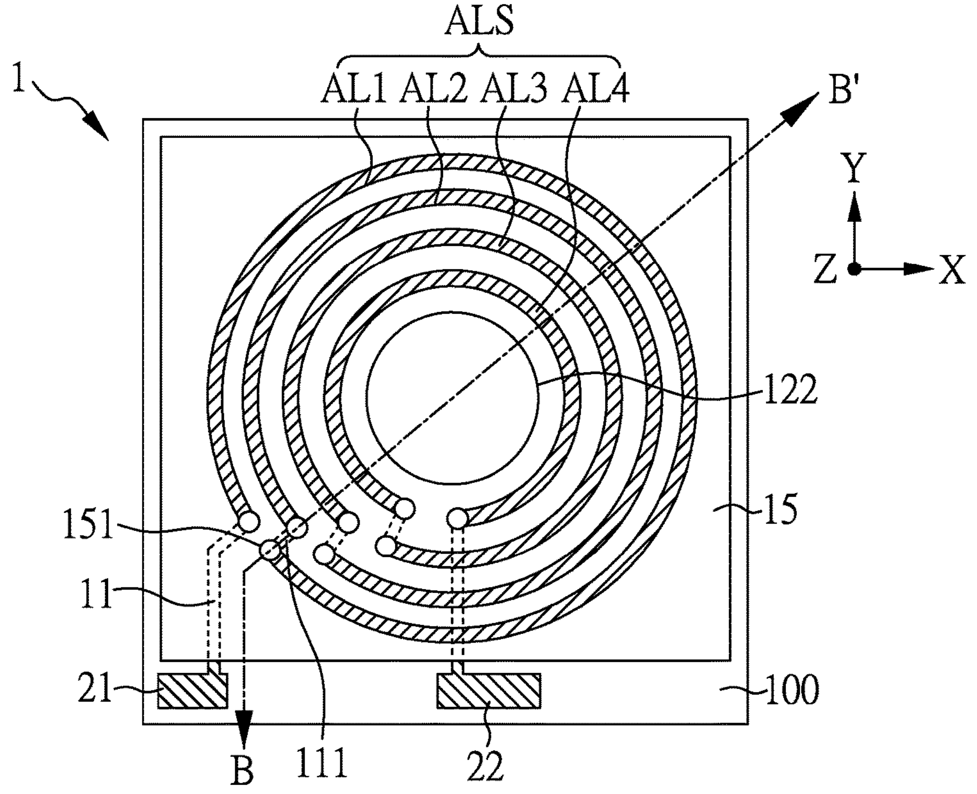
FIG. 3A is a top view of an electronic device according to an embodiment of the present disclosure.
Figure 3B:
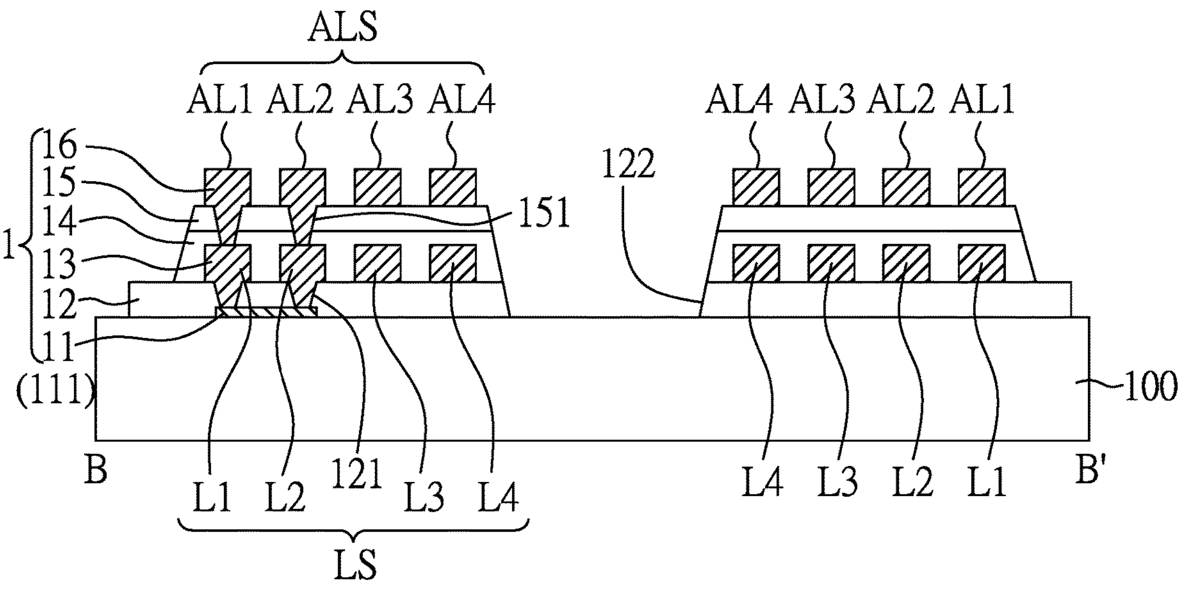
FIG. 3B is a cross-sectional view of the electronic device taken along line B-B' in FIG. 3A.

FIG. 3A is a top view of an electronic device according to an embodiment of the present disclosure, and FIG. 3B is a cross-sectional view of the electronic device taken along line B-B' in FIG. 3A, wherein the electronic device in FIG. 3A is similar to that in FIG. 1A except for the following differences.

In one embodiment of the present disclosure, as shown in FIG. 3A and FIG. 3B, the coil structure 1 may further comprise: a third conductor layer 16 including a plurality of auxiliary line segments ALS, wherein the plurality of auxiliary line segments ALS are separated from each other; and a second insulation layer 15 disposed between the second conductor layer 13 and the third conductor layer 16, wherein the second insulation layer 15 includes a plurality of second openings 151. The plurality of auxiliary line segments ALS of the third conductor layer 16 are respectively electrically connected to the plurality of line segments LS of the second conductor layer 13 through the plurality of second openings 151 of the second insulation layer 15.

More specifically, as shown in FIG. 3A, the coil structure 1 may include a plurality of concentric circular auxiliary line segments ALS separated from each other, such as the first auxiliary line segment AL1, the second auxiliary line segment AL2, the third auxiliary line segment AL3 and the fourth auxiliary line segment AL4. The length of the first auxiliary line segment AL1 may be greater than the length of the second auxiliary line segment AL2, and the first auxiliary line segment AL1 may be arranged to surround the second auxiliary line segment AL2. The length of the second auxiliary line segment AL2 may be greater than the length of the third auxiliary line segment AL3, and the second auxiliary line segment AL2 may be arranged to surround the third auxiliary line segment AL3. The length of the third auxiliary line segment AL3 may be greater than the length of the fourth auxiliary line segment AL4, and the third auxiliary line segment AL3 may be arranged to surround the fourth auxiliary line segment AL4. In addition, as shown in FIG. 3B, in the cross-sectional view taken along line BB', the second insulation layer 15 may be disposed on the second conductor layer 13, and the third conductor layer 16 may be disposed on the second insulation layer 15, wherein the first auxiliary line segment AL1 may be electrically connected to the corresponding first line segment L1 through the second opening 151 of the second insulation layer 15, and the second auxiliary line segment AL2 may be electrically connected to the corresponding second line segment L2 through the second opening 151 of the second insulation layer 15, so that the first auxiliary line segment AL1 and the second auxiliary line segment AL2 may be electrically connected to each other through the first line segment L1, the connection line 111 and the second line segment L2. Similarly, in other cross-sectional views, the third auxiliary line segment AL3 may be electrically connected to the corresponding third line segment L3 through the second opening 151 of the second insulation layer 15, and the fourth auxiliary line segment AL4 may be electrically connected to the corresponding fourth line segment L4 through the second opening 151 of the second insulation layer 15, so that the plurality of auxiliary line segments ALS are electrically connected to the plurality of line segments LS thereby forming a stacked induction coil. Therefore, in the present disclosure, the first electrode 21, the plurality of auxiliary line segments ALS, the plurality of line segments LS and the second electrode 22 may be electrically connected to each other in series.

In one embodiment of the present disclosure, as shown in FIG. 3A, in the normal direction Z of the substrate 100, the plurality of auxiliary line segments ALS of the third conductor layer 16 may at least partially overlap the plurality of line segments LS of the second conductor layer 13. For example, the plurality of auxiliary line segments ALS of the third conductor layer 16 may substantially overlap the plurality of line segments LS of the second conductor layer 13, but the present disclosure is not limited thereto.

In this embodiment, as shown in FIG. 3A, the plurality of auxiliary line segments ALS are similar to the line segments LS (as shown in FIG. 1A), and may be concentric circles separated from each other. However, in other embodiments of the present disclosure, the plurality of auxiliary line segments ALS may also be concentric rectangular auxiliary line segments or concentric elliptical auxiliary line segments separated from each other, but the present disclosure is not limited thereto. In addition, similarly, in other embodiments of the present disclosure, the plurality of auxiliary line segments ALS may include two, three, four, five or more auxiliary line segments ALS separated from each other, but the present disclosure is not limited thereto. In the present disclosure, the material of the third conductor layer 16 is as described for the first conductor layer 11 or the second conductor layer 13, the second insulation layer 15 may be a single-layer or multi-layer structure, and the material of the second insulation layer 15 is as described for the first insulation layer 12, so that a detailed description is deemed unnecessary.

In addition, although not shown in the figures, in one embodiment of the present disclosure, the coil structure 1 may further include a second protection layer disposed on the third conductor layer 16. The second protection layer may be used to protect the third conductor layer 16. In the present disclosure, the material of the second protection layer may be as described for the first protection layer 14, and thus a detailed description is deemed unnecessary. Furthermore, although not shown in the figures, in one embodiment of the present disclosure, the first protection layer 14 and the second insulation layer 15 may be combined into a single layer so as to simplify the manufacturing process. For example, the second insulation layer 15 may be omitted, and the plurality of auxiliary line segments ALS of the three conductor layer 16 are respectively electrically connected to the plurality of line segments LS of the second conductor layer 13 through the openings of the first protection layer 14.

Figure 4A:
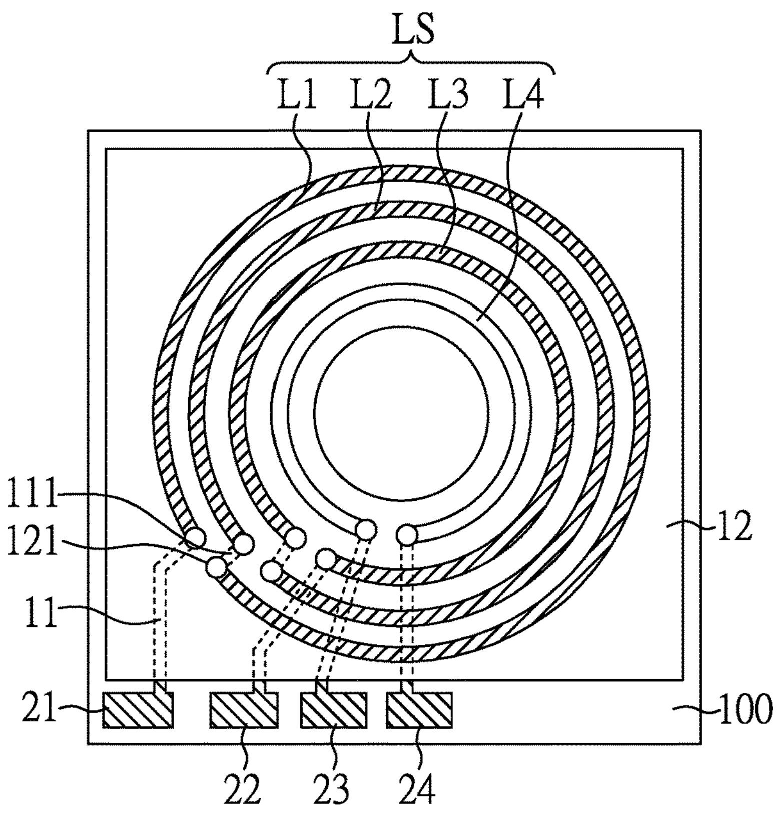
FIGS. 4A and FIG. 4B are top views of an electronic device according to an embodiment of the present disclosure.
Figure 4B:
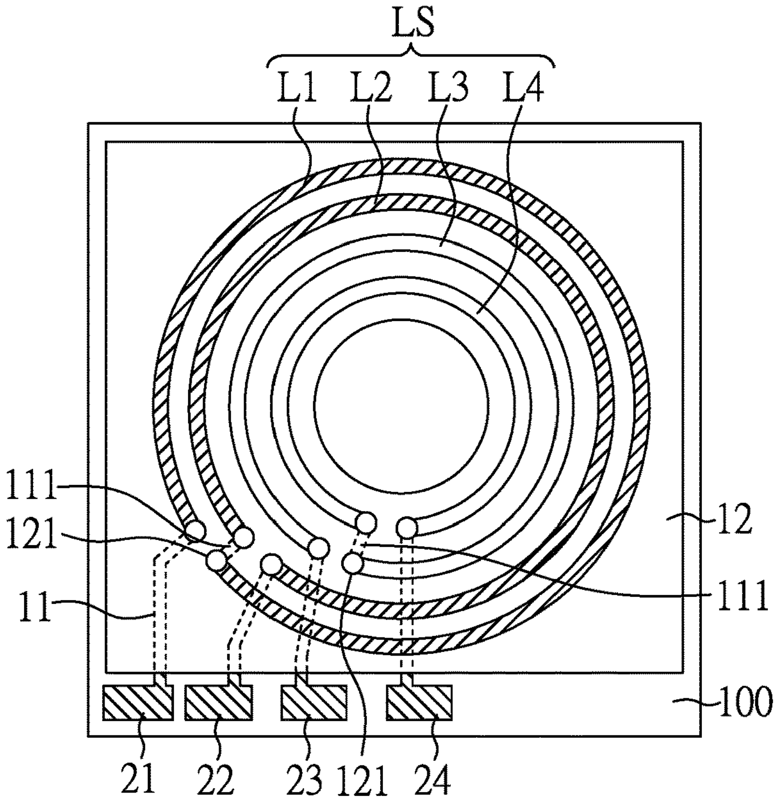

FIG. 4A and FIG. 4B are top views of an electronic device according to an embodiment of the present disclosure, wherein the electronic device in FIG. 4A and FIG. 4B is similar to that in FIG. 1A except for the following differences.

In one embodiment of the present disclosure, as shown in FIG. 4A, the electronic device may further includes a first electrode 21, a second electrode 22, a third electrode 23 and a fourth electrode 24 respectively arranged on the substrate 100. The plurality of line segments LS includes a first line segment L1, a second line segment L2, a third line segment L and a fourth line segment L4, wherein the first line segment L1, the second line segment L2 and the third line segment L3 may be electrically connected through corresponding connection lines 111, respectively. The first electrode 21, the first line segment L1, the second line segment L2, the third line segment L3 and the second electrode 22 may form a first series-connection path, and the third electrode 23, the fourth line segment L4 and the fourth electrode 24 may form a second series-connection path, wherein the first series-connection path and the second series-connection path are electrically insulated from each other. Therefore, different voltages may be provided to the first series-connection path and the second series-connection path, respectively.

In one embodiment of the present disclosure, as shown in FIG. 4B, the electronic device may further include a first electrode 21, a second electrode 22, a third electrode 23, and a fourth electrode 24 respectively arranged on the substrate 100. The plurality of line segments LS include a first line segment L1, a second line segment L2, a third line segment L3 and a fourth line segment L4, wherein the first line segment L1 and the second line segment L2 may be electrically connected through the connection line 111, and the third line segment L3 and the fourth line segment L4 may be electrically connected through another connection line 111. The first electrode 21, the first line segment L1, the second line segment L2 and the second electrode 22 may form a first series-connection path, and the third electrode 23, the third line segment L3, the fourth line segment L4 and the fourth electrode 24 may form a second series-connection path, wherein the first series-connection path and the second series-connection path are electrically insulated from each other. Therefore, different voltages may be provided to the first series-connection path and the second series-connection path, respectively.

In the present disclosure, the same or different materials may be used to prepare the third electrode 23 and the fourth electrode 24, and the materials of the third electrode 23 and the fourth electrode 24 may be as described for the first electrode 21 or the second electrode 22 so that a detailed description is deemed unnecessary. In addition, in one embodiment of the present disclosure, the first electrode 21, the second electrode 22, the third electrode 23 and the fourth electrode 24 may be respectively formed in the first conductor layer 11 or the second conductor layer 13, so as to simplify the manufacturing process. However, in another embodiment of the present disclosure, the first electrode 21, the second electrode 22, the third electrode 23 and the fourth electrode 24 may also be respectively formed in other conductor layers.

Figure 5A:
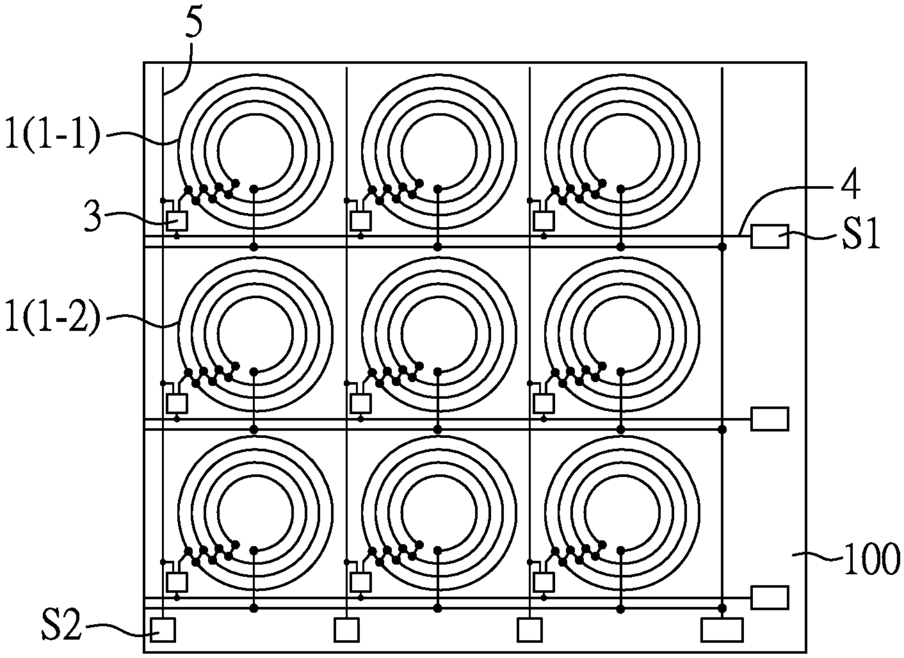
FIGS. 5A and 5B are top views of an electronic device according to an embodiment of the present disclosure.
Figure 5B:
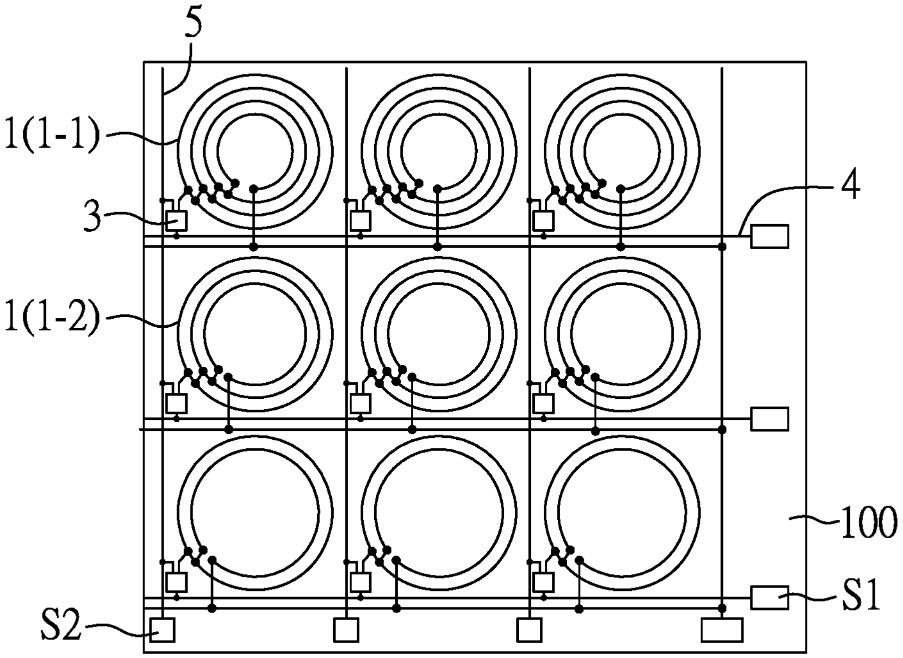

FIG. 5A and FIG. 5B are top views of an electronic device according to an embodiment of the present disclosure.

In one embodiment of the present disclosure, as shown in FIG. 5A, the electronic device may include an active element 3 disposed on a substrate 100, wherein the active element 3 may be electrically connected to the coil structure 1, and the coil structure 1 may be as shown in FIG. 1A so that a detailed description is deemed unnecessary. Therefore, the electronic device of the present disclosure may control the magnitude of the voltage supplied to the coil structure 1 through the active element 3.

In the present disclosure, the electronic device may be an electronic device having an array coil structure. More specifically, as shown in FIG. 5A, the electronic device may include: a substrate 100; a plurality of scanning lines 4 arranged on the substrate 100; a plurality of data lines 5 arranged on the substrate 100, wherein the plurality of data lines 5 respectively intersect with the plurality of scanning lines 4; a plurality of active elements 3 arranged on the substrate 100, wherein each of the plurality of active elements 3 is electrically connected to one of the plurality of scanning lines 4 and one of the plurality of data lines 5; and a plurality of coil structures 1 arranged on the substrate 100, wherein the plurality of coil structures 1 are electrically connected to the plurality of active elements 3, respectively. The signal sources S1 and S2 may provide scanning signals and data signals to the active element 3 through the scanning line 4 and the data line 5, respectively, and the voltages supplied to the coil structures 1 may be respectively controlled through the active elements 3. The active element 3 may be, for example, a thin film transistor.

In one embodiment of the present disclosure, a plurality of coil structures 1 may have the same design as each other. As shown in FIG. 5A, the coil structures 1 may include a first coil structure 1-1 and a second coil structure 1-2, wherein the first coil structure 1-1 and the second coil structure 1-2 each may be shown as the coil structure 1 in FIG. 1A so that a detailed description is deemed unnecessary. Therefore, the total coil length of the first coil structure 1-1 and the total coil length of the second coil structure 1-2 may be the same. In other embodiments of the present disclosure, the plurality of coil structures may be shown as any one of the coil structures 1 in FIG. 1A to FIG. 3A, and thus a detailed description is deemed unnecessary.

In one embodiment of the present disclosure, a plurality of coil structures 1 may be provided with different designs from each other. As shown in FIG. 5B, the plurality of coil structures 1 may include a first coil structure 1-1 and a second coil structure 1-2, wherein the total coil length of the first coil structure 1-1 may be different from the total coil length of the second coil structure 1-2, but the present disclosure is not limited to that illustrated in FIG. 5B. In other embodiments of the present disclosure, the plurality of coil structures 1 may be shown as the coil structures 1 in FIG. 1A to FIG. 3A, and thus a detailed description for the coil structures 1 is deemed unnecessary.

Figure 6A:
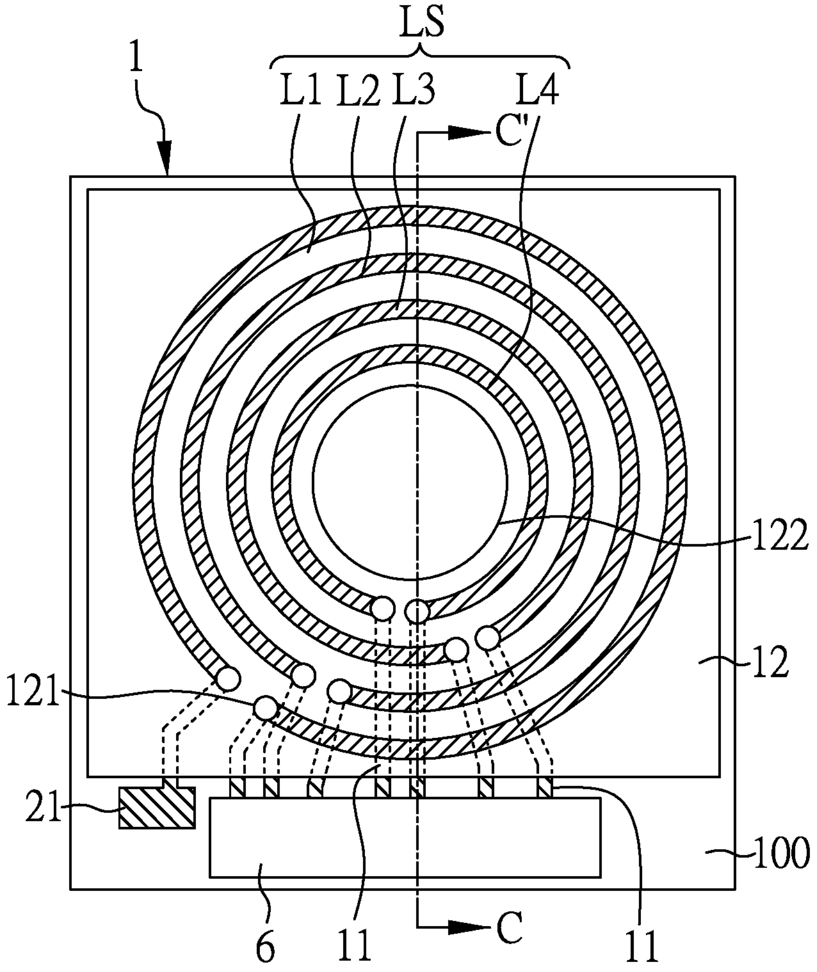
FIG. 6A is a top view of an electronic device according to an embodiment of the present disclosure.
Figure 6B:
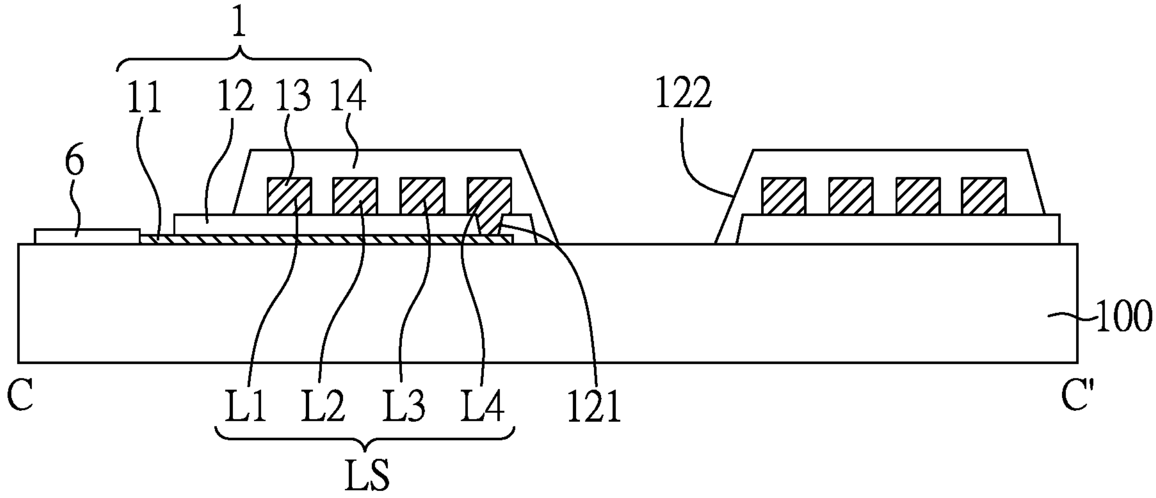
FIG. 6B is a cross-sectional view of the electronic device taken along line C-C' in FIG. 6A.

FIG. 6A is a top view of an electronic device according to an embodiment of the present disclosure, and FIG. 6B is a cross-sectional view of the electronic device taken along line C-C' in FIG. 6A.

In one embodiment of the present disclosure, as shown in FIG. 6A and FIG. 6B, the electronic device may include: a substrate 100; and a coil structure 1, a first electrode 21 and a switching element 6 respectively arranged on the substrate 100, wherein the first electrode 21 and the switching element 6 are respectively electrically connected to the coil structure 1. The coil structure 1 may include: a first conductor layer 11; a second conductor layer 13 including a plurality of line segments LS separated from each other; and a first insulation layer 12 disposed between the first conductor layer 11 and the second conductor layer 13, wherein the first insulation layer 12 includes a plurality of first openings 121. The plurality of line segments LS are respectively electrically connected to the first conductor layer 11 through the plurality of first openings 121.

More specifically, as shown in FIG. 6A, the coil structure 1 may include a plurality of concentric circular line segments LS separated from each other, such as a first line segment L1, a second line segment L2, a third line segment L3 and a fourth line segment L4, ends of each line segment are electrically connected to the first conductor layer 11 through the first openings 121 of the first insulation layer 12, respectively, and the first conductor layer 11 is electrically connected to the switching element 6. Therefore, the two ends of the first line segment L1 are electrically connected to the first electrode 21 and the switching element 6, respectively, the two ends of the second line segment L2 are respectively electrically connected to the switching element 6, the two ends of the third line segment L3 are respectively electrically connected to the switching element 6, and the two ends of the fourth line segment L4 are respectively electrically connected to the switching element 6. As shown in FIG. 6B, in the cross-sectional view taken along line C-C', the fourth line segment L4 may be electrically connected to the first conductor layer 11 through the first opening 121 of the first insulation layer 12, and the first conductor layer 11 may be electrically connected to the switching element 6. Therefore, the plurality of line segments LS of the coil structure 1 may be electrically connected to each other through the switching element 6, so that the first electrode 21, the switching element 6 and the coil structure 1 form a series-connection path. In the present disclosure, the switching element 6 may be a thin film transistor circuit fabricated on the substrate 100 using a thin film process, such as a de-multiplexer circuit, or an integrated circuit fabricated using an integrated circuit process, but the present disclosure is not limited thereto.

In addition, in one embodiment of the present disclosure, as shown in FIG. 6B, the coil structure 1 may further include a first protection layer 14 disposed on the second conductor layer 13. The first protection layer 14 may be used to protect the second conductor layer 13. In this embodiment, the materials of the substrate 100, the first electrode 21, the first conductor layer 11, the second conductor layer 13, the first insulation layer 12, and the first protection layer 14 may be as described above, and thus a detailed description is deemed unnecessary.

Figure 7:
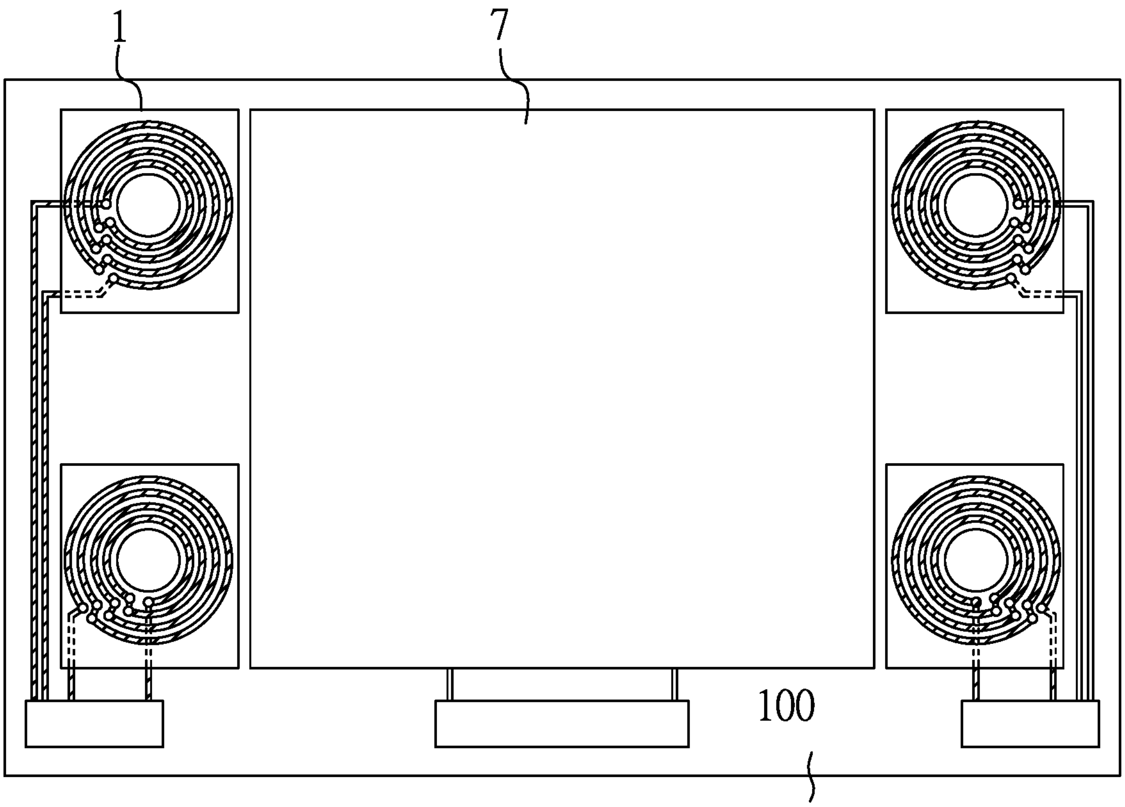
FIG. 7 is a schematic diagram of an electronic device according to an embodiment of the present disclosure.

FIG. 7 is a schematic diagram of an electronic device according to an embodiment of the present disclosure.

In one embodiment of the present disclosure, the coil structure 1 may be integrated with a display panel 7. Therefore, the electronic device of the present disclosure may be a display device. As shown in FIG. 7, the electronic device includes a substrate 100; a display panel 7 disposed on the substrate 100; and a plurality of coil structures 1 disposed on the substrate 100 and adjacent to the display panel 7.

In the present disclosure, the display panel 7 may be any suitable display panel, and the display panel may include liquid crystals, light emitting diodes, fluorescence or phosphor, and the light emitting diode may for example, include organic light emitting diode (OLED), sub-millimeter light emitting diode (mini LED), micro light emitting diode (micro LED) or quantum dot light emitting diode (quantum dot LED), but the present disclosure is not limited thereto. The coil structure 1 may be as described above, and thus a detailed description is deemed unnecessary.

Figure 8:
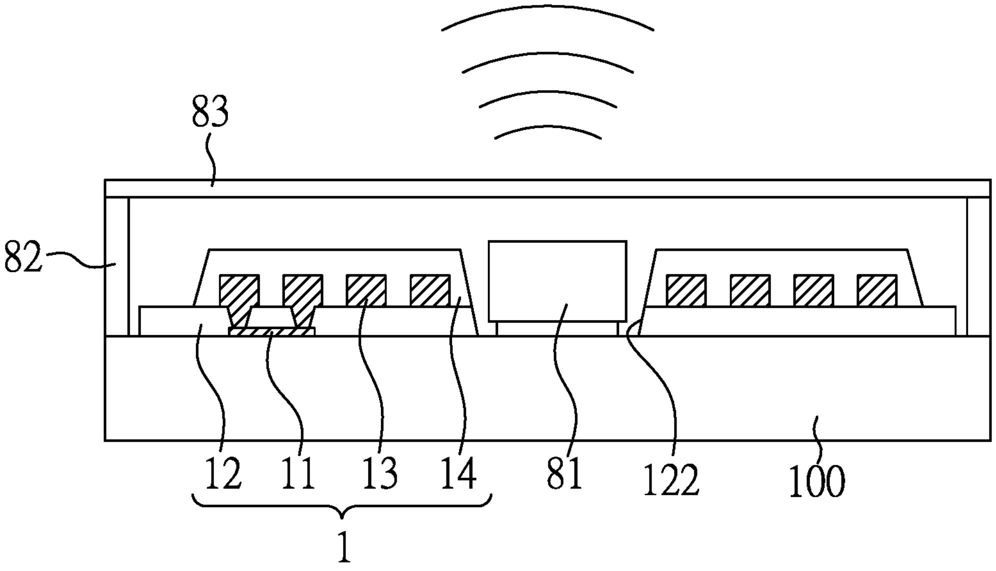
FIG. 8 is a cross-sectional view of an electronic device according to an embodiment of the present disclosure.

FIG. 8 is a cross-sectional view of an electronic device according to an embodiment of the present disclosure, wherein the electronic device in FIG. 8 is similar to that in FIG. 1A and FIG. 1B except for the following differences.

In one embodiment of the present disclosure, as shown in FIG. 8, the electronic device may further include: a magnetic permeable element 81 disposed on the substrate 100 and disposed in the opening 122; a support member 82 disposed on the substrate 100 and surrounding the coil structure 1; and a diaphragm 83 disposed on the support member 82 and corresponding to the magnetic permeable element 81. When the coil structure 1 is energized, a magnetic field is generated, and the magnetic field interacts with the magnetic permeable element 81 to vibrate the diaphragm 83, so that the diaphragm 83 pushes the surrounding air to generate sound. Therefore, in one embodiment of the present disclosure, the electronic device may be a speaker device.

In this embodiment, the coil structure 1 shown in FIG. 1A and FIG. 1B is taken as an example. In other embodiments of the present disclosure, the coil structure 1 may be shown as any one of the coil structures 1 in FIG. 1A to FIG. 4B, so that a detailed description for the coil structure 1 is deemed unnecessary.

In the present disclosure, the material of the magnetic permeable element 81 may include iron, low carbon steel, nickel-iron alloy, iron-silicon alloy, iron-cobalt alloy, ultra-microcrystalline soft iron alloy, a combination thereof or other suitable magnetic permeable materials, but the present disclosure is not limited thereto. In the present disclosure, the diaphragm 83 may be a magnetic diaphragm, which may include a base material and a magnetic permeable material coated on the base material. The magnetic permeable material may be as described for the magnetic permeable element, and thus a detailed description is deemed unnecessary. Herein, the substrate may be a flexible substrate, such as plastic film, metal film, paper, cloth, or other suitable materials, but the present disclosure is not limited thereto.

Figure 9:
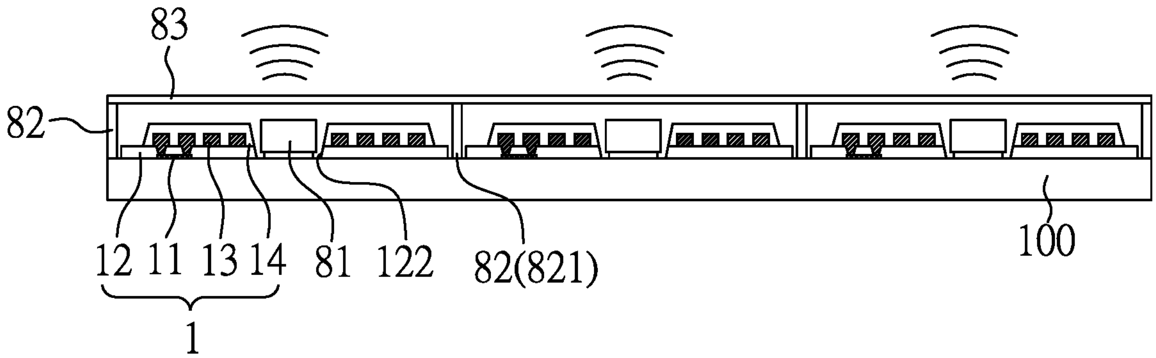
FIG. 9 is a cross-sectional view of an electronic device according to an embodiment of the present disclosure.

FIG. 9 is a cross-sectional view of an electronic device according to an embodiment of the present disclosure, wherein the electronic device in FIG. 9 is similar to that in FIG. 8 except for the following differences.

In one embodiment of the present disclosure, the electronic device may have an array coil structure (as shown in FIG. 5A or FIG. 5B), and thus, when the electronic device is a speaker device, as shown in FIG. 9, the electronic device may further include: a plurality of magnetic permeable elements 81 disposed on the substrate 100 and respectively disposed in the plurality of openings 122; a plurality of support members 82 disposed on the substrate 100 to surround each one of the plurality of coil structures 1; and a diaphragm 83 disposed on the support member 82 and corresponding to the plurality of magnetic permeable elements 81.

In one embodiment of the present disclosure, as shown in FIG. 9, the plurality of magnetic permeable elements 81 may share the same diaphragm 83. Therefore, in the normal direction Z of the substrate 100, the diaphragm 83 may overlap the plurality of magnetic permeable elements 81 at the same time, but the present disclosure is not limited thereto. In another embodiment of the present disclosure, although not shown in the figures, the electronic device may include a plurality of diaphragms 83 disposed on the support member 82 and respectively corresponding to the plurality of magnetic permeable elements 81. Therefore, in the normal direction Z of the substrate 100, one of the diaphragms 83 may overlap one of the magnetic permeable elements 81. A plurality of diaphragms 83 may vibrate independently without being influenced by the vibration of adjacent diaphragms 83. In addition, in one embodiment of the present disclosure, as shown in FIG. 9, adjacent coil structures 1 may share a side wall 821 of the support member 82, but the present disclosure is not limited thereto.

The aforementioned specific embodiments should be construed as merely illustrative, and not limiting the rest of the present disclosure in any way.

The invention claimed is:

1. An electronic device, comprising:

a substrate; and a coil structure disposed on the substrate, and provided with:

a first conductor layer including a connection line;

a second conductor layer including a plurality of line segments separated from each other; and a first insulation layer disposed between the first conductor layer and the second conductor layer, and provided with a plurality of first openings, wherein adjacent two of the plurality of line segments are electrically connected to the connection line through the plurality of first openings.

2. The electronic device as claimed in claim 1, wherein the second conductor layer is disposed on the first conductor layer.

3. The electronic device as claimed in claim 1, wherein the plurality of line segments include a first line segment and a second line segment, the first line segment and the second line segment are electrically connected to the connection line through the plurality of first openings, and the first line segment surrounds the second line segment.

4. The electronic device as claimed in claim 3, wherein a length of the first line segment is greater than that of the second line segment.

5. The electronic device as claimed in claim 3, further comprising a first electrode and a second electrode respectively disposed on the substrate, wherein the first electrode, the first line segment, the second line segment and the second electrode are electrically connected in series.

6. The electronic device as claimed in claim 3, wherein the plurality of line segments include a floating line segment, and the floating line segment is electrically insulated from the first line segment or the second line segment.

7. The electronic device as claimed in claim 6, wherein the first line segment or the second line segment surrounds the floating line segment.

8. The electronic device as claimed in claim 1, wherein the coil structure further comprises:

a third conductor layer including a plurality of auxiliary line segments separated from each other; and a second insulation layer disposed between the second conductor layer and the third conductor layer, and provided with a plurality of second openings, wherein the plurality of auxiliary line segments of the third conductor layer are electrically connected to the plurality of line segments of the second conductor layer respectively through the plurality of second openings of the second insulation layer.

9. The electronic device as claimed in claim 8, wherein, in the normal direction of the substrate, the plurality of auxiliary line segments of the third conductor layer at least partially overlap the plurality of line segments of the second conductor layer.

10. The electronic device as claimed in claim 1, further comprising a first electrode, a second electrode, a third electrode, and a fourth electrode respectively disposed on the substrate, wherein the plurality of line segments include a first line segment, a second line segment and a third line segment, the first electrode, the first line segment, the second line segment and the second electrode form a first series-connection path, and the third electrode, the third line segment and the fourth electrode form a second series-connection path.

11. The electronic device as claimed in claim 1, further comprising an active element disposed on the substrate, wherein the active element is electrically connected to the coil structure.

12. The electronic device as claimed in claim 4, wherein the plurality of line segments include a first floating line segment and a second floating line segment, a length of the second line segment is greater than that of the first floating line segment, a length of the first floating line segment is greater than that of the second floating line segment, and the first line segment and the second line segment are electrically insulated from the first floating line segment and the second floating line segment.

13. The electronic device as claimed in claim 12, wherein the first line segment and the second line segment are arranged to surround the first floating line segment and the second floating line segment.

14. The electronic device as claimed in claim 3, further comprising a first electrode and a switching element respectively disposed on the substrate, wherein the first electrode and the switching element are respectively electrically connected to the coil structure, two ends of the first line segment are respectively electrically connected to the first electrode and the switching element, and the two ends of the second line segment are respectively electrically connected to the switching element.

15. The electronic device as claimed in claim 1, wherein the first insulation layer includes an opening, and the plurality of line segments are arranged to respectively surround the opening.

16. The electronic device as claimed in claim 15, further comprising: a magnetic permeable element arranged on the substrate and disposed in the opening; a support member arranged on the substrate and surrounding the coil structure; and a diaphragm arranged on the support and corresponding to the magnetic permeable element.

17. A speaker device, comprising:

a substrate;

a plurality of scanning lines arranged on the substrate;

a plurality of data lines arranged on the substrate, wherein the plurality of data lines intersect with the plurality of scanning lines, respectively;

a plurality of active elements arranged on the substrate, wherein each of the plurality of active elements is electrically connected to one of the plurality of scan lines and one of the plurality of data lines; and a plurality of coil structures arranged on the substrate, wherein the plurality of coil structures are electrically connected to the plurality of active elements, respectively.

18. The speaker device as claimed in claim 17, wherein one of the plurality of coil structures comprises:

a connection line; and a plurality of line segments separated from each other;

wherein adjacent two of the plurality of line segments are electrically connected through the connection line.

19. The speaker device as claimed in claim 17, wherein the plurality of coil structures include a first coil structure and a second coil structure, and a total coil length of the first coil structure is different from that of the second coil structure.

20. The speaker device as claimed in claim 17, wherein one of the plurality of coil structures comprises:

a first conductor layer including a connection line;

a second conductor layer including a plurality of line segments separated from each other; and a first insulation layer disposed between the first conductor layer and the second conductor layer, wherein the first insulation layer includes a plurality of first openings;

wherein adjacent two of the plurality of line segments are electrically connected to the connection line through the plurality of first openings.

* * * * *